(12) United States Patent
Sawano

(10) Patent No.: US 7,019,854 B1
(45) Date of Patent: Mar. 28, 2006

(54) PRINTING SYSTEM AND PRINTING METHOD THEREIN

(75) Inventor: Takashi Sawano, Yamatokoriyama (JP)

(73) Assignee: Sharp Kabushiki Kaisha, Osaka (JP)

( * ) Notice: Subject to any disclaimer, the term of this patent is extended or adjusted under 35 U.S.C. 154(b) by 0 days.

(21) Appl. No.: 09/537,367

(22) Filed: Mar. 29, 2000

(30) Foreign Application Priority Data

Apr. 28, 1999 (JP) ................... 11-121096

(51) Int. Cl.
G06F 15/00 (2006.01)
H04N 1/00 (2006.01)
H04N 1/40 (2006.01)

(52) U.S. Cl. ................... 358/1.15; 358/1.16; 358/1.17; 358/404; 358/437; 358/444

(58) Field of Classification Search ............... 358/1.15, 358/1.16, 1.17, 404, 444, 437
See application file for complete search history.

(56) References Cited

U.S. PATENT DOCUMENTS

| 5,964,851 | A | * | 10/1999 | Ueda ........................... 710/17 |
| 6,052,201 | A | * | 4/2000 | Shibaki et al. ............. 358/1.16 |
| 6,191,866 | B1 | * | 2/2001 | Kim ............................ 358/1.2 |
| 6,317,193 | B1 | * | 11/2001 | Funahashi .................... 355/40 |
| 6,480,295 | B1 | * | 11/2002 | Taoda ........................ 358/1.16 |
| 6,671,062 | B1 | * | 12/2003 | Kanipakam et al. ........ 358/1.15 |
| 6,876,466 | B1 | * | 4/2005 | Morikawa et al. .......... 358/1.17 |

FOREIGN PATENT DOCUMENTS

| JP | 6-55783 | 3/1994 |
| JP | 8-207401 | 8/1996 |
| JP | 08-238811 | 9/1996 |
| JP | 9-190302 | 7/1997 |
| JP | 10-44529 | 2/1998 |

* cited by examiner

Primary Examiner—Edward Coles
Assistant Examiner—Chan S. Park
(74) Attorney, Agent, or Firm—Edwards Angell Palmer & Dodge; David G. Conlin; George W. Hartnell

(57) ABSTRACT

Control means for controlling memory means and an output section is provided in a printing system which stores print data transmitted from a host in a page unit in a memory device and which prints out the print data stored in the memory device through the output section. The control means, upon detecting presence of transmission of print data which exceed a memory capacity of the memory device, instructs the memory means (e.g., page managing memory) to store identification information for identifying the print data of exceeding pages. The print data stored and the print data of exceeding pages re-transmitted from the host are combined with each other by memory means (e.g., page combining memory), and they are outputted from a print data output section. Thus, print data of a small volume can be stored entirely in the memory means to be printed out, and even when the print data exceed the memory capacity of the memory means, the minimum volume of data required is re-transmitted from the host to be printed out. As a result, the memory device can be realized with a small buffer capacity.

38 Claims, 12 Drawing Sheets

PRINTING SYSTEM AND PRINTING METHOD THEREIN

FIELD OF THE INVENTION

The present invention relates to a printing system which can store print data which have been sent from a host device, and to a printing method in such a printing system, and in particular the invention relates to a printing system which prints out print data which are stored in a page unit and print data which were sent from a host device, and to a printing method in such a printing system.

BACKGROUND OF THE INVENTION

In printing devices as represented by printers, a printing process is generally carried out upon receipt of a print command and print data from a host device which is realized by an information processing device as represented by a personal computer or information portable terminal, etc., and in a printing process one often needs to carry out printing again using the same print data, as necessitated by undesirable print conditions and a shortage of print copies.

However, in a conventional printing device, once a printing process is run, the print data temporarily stored in a buffer (work memory) of the printing device are lost, and re-printing would require re-transmission of the same print data from the host device to be received again by the printing device for another printing process, requiring the user to operate the host device for re-transmission, and requiring the printing device to develop the print data again into the image data, and as a result operability and working efficiency suffer greatly and more burden is put on the host device.

In view of these drawbacks, for the purpose of omitting re-transmission of print data from the host device when re-printing the once printed print data, Japanese Unexamined Patent Publication No. 55783/1994 (Tokukaihei 6-55783) (published date: Mar. 1, 1994) ("prior art ①" hereinafter) proposes a printing device in which the print data sent from the host device are stored in a buffer, and by the provision of mode selecting means by which a normal mode and a re-use mode can be selected, the print data stored in the buffer are maintained when the re-use mode is selected.

However, in the technique as recited in prior art ①, it is required to install a large capacity buffer with enough free memory space to temporarily store various print data, and for this reason a low-end printing device, which is not opt for an expensive large capacity buffer is forced to adopt the same mode of re-transmitting print data from the host device as with the conventional method.

As another alternative, Japanese Unexamined Patent Publication No. 44529/1998 (Tokukaihei 10-44529) (published date: Feb. 17, 1998) ("prior art ②" hereinafter) proposes a printing method and printing device which take into consideration relatively cheaper printing devices with a small memory capacity, in which the time taken for a printing process is reduced by re-using the stored print data when the print data are within the capacity of the memory means, and when the print data exceed the memory capacity, only the print data re-transmitted from the host device are printed out so as to reduce the burden put on the host device.

Meanwhile, from a viewpoint of efficient use of resources and efficient use of space for a document, there is demand in printing devices which are capable of double-sided printing. However, double-sided printing cannot be carried out in the event where the buffer overflows while processing the print data of one side of the double-sided document in the printing device, and when that happens, they cannot be paired with the print data of the other side of the double-sided document.

In view of this drawback, Japanese Unexamined Patent Publication No. 207401/1996 (Tokukaihei 8-207401) (published date: Aug. 13, 1996) ("prior art ③" hereinafter) proposes a double-sided printing device, double-sided printing method, and double-sided printing system, in which a front page which was received first is stored so that it can be matched with the back page in output, and the front page is printed after printing the back page so as to prevent overflow without unnecessarily increasing the buffer capacity of the printing device capable of double-sided printing.

Further, Japanese Unexamined Patent Publication No. 190302/1997 (Tokukaihei 9-190302) (published date: Jul. 22, 1997) ("prior art ④" hereinafter) discloses a printing system which realizes double-sided printing with high throughput without unnecessarily increasing the buffer capacity by the provision of a page order rearranging control section in the host device, by which, to carry out double-sided printing, the order of pages to be transmitted to the printing device is rearranged in the order of double-sided printing.

However, in prior art ②, because the data to be used for printing of multiple copies are either stored print data or print data which were re-transmitted from the host device, the data are not used efficiently when the buffer overflows, and in this respect, prior art ② is not sufficient.

Further, the drawback of the techniques as recited in prior art ③ and prior art ④ is that they are insufficient when the capacity of the memory means is overflown by the print data when printing the first and last pages on a single sheet of paper as in brochure printing.

Further, in order for the host device to arrange the page order, means for carrying out such a function needs to be provided in the host device. However, in the case where non-page independent PDL (Page-Description Language) is used, the content of a succeeding page may have an adverse effect on the following page in a print job, which often makes it difficult to arrange the page order on the host side. Note that, the PDL refers to a printer control code (language) for creating a page image in page printing.

SUMMARY OF THE INVENTION

The present invention was made to solve the foregoing problems, and it is an object of the present invention to provide a printing system which stores all print data in memory means when the volume of the print data is small, and which can utilize the print data stored in the memory means even when overflow occurs, and also to provide a printing method in such a printing system.

It is another object of the present invention to provide a printing system which is capable of printing by combining stored print data and the print data transmitted from a host device so as to compensate for the capacity limit of the memory means when data are to be processed by storing entire print data as in brochure printing and multiple copy printing (by electrical sort), instead of replacement of pages as in double-sided printing, and also to provide a printing method in such a printing system.

It is yet another object of the present invention to provide a printing system which can freely change the combination of the stored data to be re-used and the data which are to be re-transmitted depending on situations, and also to provide a printing method in such a printing system.

In order to achieve the foregoing objects, a printing system in accordance with the present invention including a host device which creates print data in a page unit and a printing device which prints out the print data transmitted from the host device, includes memory means for storing pages of the print data at least partially, wherein, when the print data are to exceed a memory capacity of the memory means, the print data are printed out by combining first print data, which correspond to print data within the memory capacity of the memory means, and second print data, which correspond to print data exceeding the memory capacity of the memory means and which are transmitted from the host device.

Further, in order to achieve the foregoing objects, a printing method in the printing system in accordance with the present invention includes the steps of (1) storing pages of print data at least partially on memory means, which print data having been transmitted in a page unit from a host device; and (2) printing the print data, when the print data are to exceed a memory capacity of the memory means, by combining first print data which correspond to print data within the a memory capacity of the memory means and second print data which are transmitted from the host device and which correspond to print data exceeding the memory capacity of the memory means.

With these arrangements, when the print data transmitted from the host device are to exceed the memory capacity of the memory means, only the first print data of the print data, which correspond to print data within the memory capacity, are stored in the memory means. Upon receiving the second print data, which correspond to print data exceeding the memory capacity, from the host device, the printing device prints out all the print data by combining the first print data and the second print data.

That is, with the above arrangements, without storing all the print data transmitted to the printing device from the host device, only the data exceeding the capacity are transmitted from the host device, and the print data are printed out using both the stored data and the transmitted data. As a result, it is not required to provide the memory means with a large capacity which is capable of storing all the print data.

Thus, even in a printing system adopting a relatively inexpensive printing device which is not provided with large capacity memory means (buffer memory, work memory), the volume of data transmitted between the host and the printing device can be reduced by utilizing the print data saved in the memory device, thus reducing burden put on the host and the printing device, etc.

Note that, because the memory means stores the print data at least partially, when the print data all fall within the memory capacity, for example, all the print data are stored. In this case, printing is carried out by directly using the print data.

Further, when the print data are to be printed out in multiple copies, because the first print data are always stored in the memory means, for example, by requesting the host device to transmit the second print data, printing can be carried out by combining the first print data and the second print data re-transmitted, thereby printing all the print data even in second and subsequent copies even when the memory capacity of the memory means is small.

The same effect can be obtained in brochure printing, in which printing of multiple copies is carried out on a single recording medium. In brochure printing, it is generally required to store the first page and the last page of the print data in the memory means and to combine the data of plural pages before printing. Nevertheless, the data to be combined are only need to be stored in the memory means at least at the time when they are combined, and it is not required to store all the data in the memory means all the time.

Thus, for example, by storing at least data of a leading side and data of a tailing side in the memory means, printing can be carried out after these data are subjected to a combining process. Also, the data which are not stored in the memory means are transmitted from the host device, and by storing the transmitted data in the memory means by overwrite, brochure printing can also be carried out for other pages as well.

Thus, even when the memory capacity of the memory means is small, brochure printing can be carried out using the first print data stored in the memory means and the second print data transmitted from the host device. Further, because it is ensured that the first and last pages of the print data are stored in the memory means, brochure printing can be carried out without failure even when the print data exceed the capacity of the memory means.

Further, because the print data are combined with each other on the printing device, it is not required to rearrange the page order on the host device.

Further, because printing is carried out using the combination of first print data and second print data, patterns of combination can be changed freely depending upon the situations of printing of multiple copies and brochure printing. As a result, printing of multiple copies and brochure printing can be realized with ease.

For a fuller understanding of the nature and advantages of the invention, reference should be made to the ensuing detailed description taken in conjunction with the accompanying drawings.

DESCRIPTION OF THE EMBODIMENTS

First Embodiment

The following will describe one embodiment of the present invention referring to the attached drawings. First, the arrangement of a printing system, which is common to all the embodiments of the present invention will be described.

Figure 2:
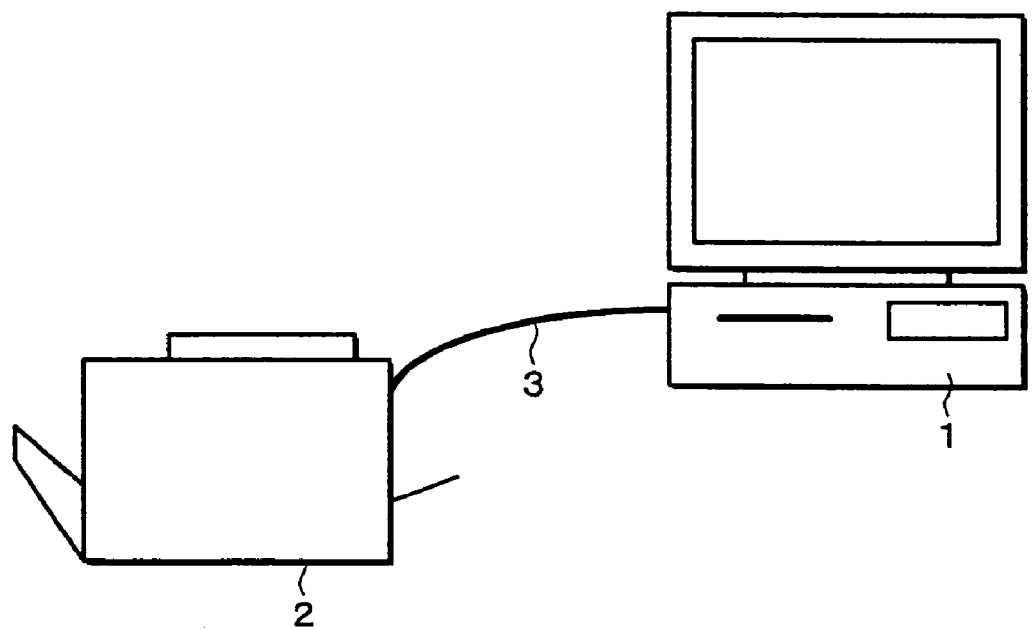
FIG. 2 is an explanatory drawing showing a schematic structure of the printing system.

FIG. 2 is an explanatory drawing showing a structure of a printing system in accordance with the present invention, in which an information processing device ("host device 1" hereinafter) 1, such as a personal computer, and a copier or printer as a printing device ("printing device 2" hereinafter) 2 are connected to each other by a cable 3, and the print data created by the host device 1 are transferred to the printing device 2 for printing. The host device 1 and printing device 2 are both capable of controlling print data, and the cable 3 is provided to be compatible with such a control.

Note that, in the description of FIG. 2, even though the host device 1 and printing device 2 are appeared to be connected to each other by wire, they may be connected to each other by wireless communication such as optical communication. Also, FIG. 2 shows the case where the host device 1 and printing device 2 are connected to each other one to one. However, evidently, the present invention is also applicable to the case where the printing device 2 is to be shared among a plurality of host devices 1. One of the objects of the present invention is to prevent re-transmission of all the print data from the host device, and the printing device 2 is commonly and suitably adopted to each embodiment.

Figure 1:
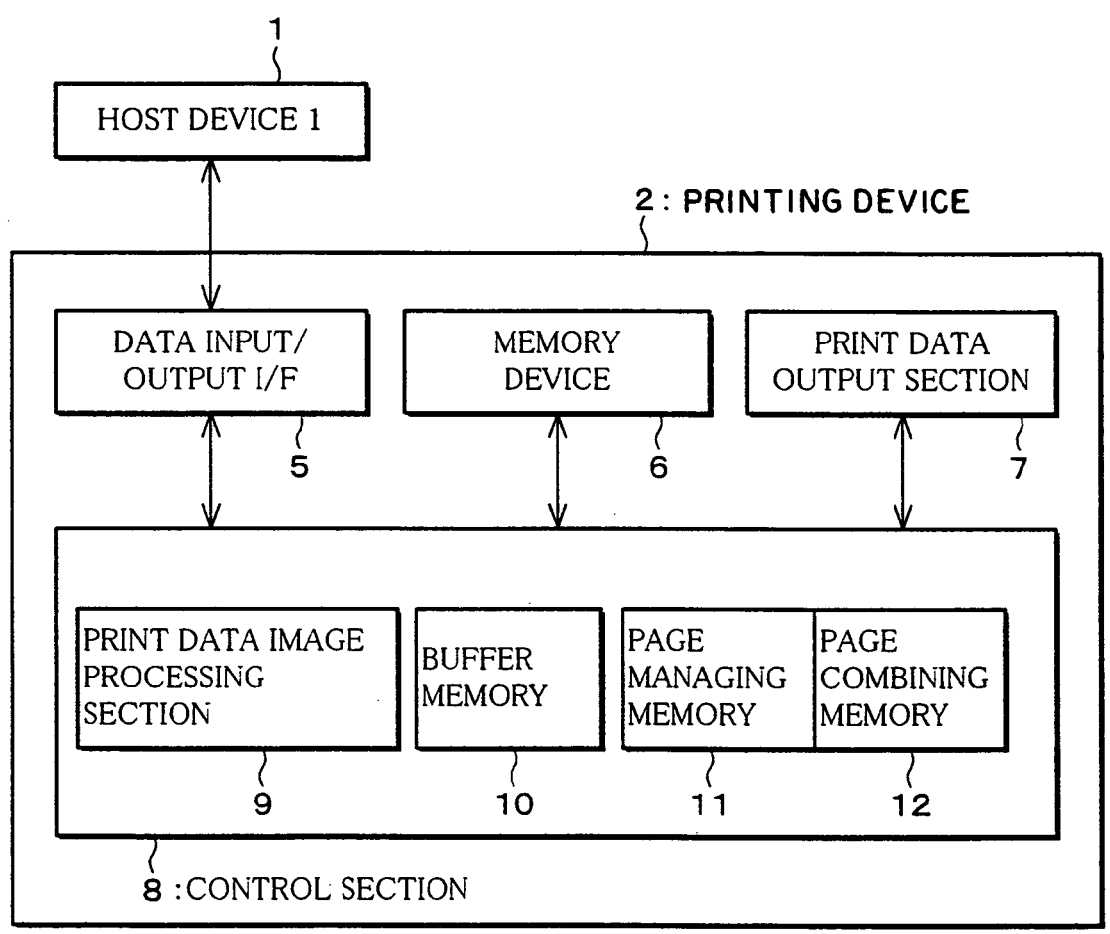
FIG. 1 is a block diagram showing a schematic structure of a printing device provided in a printing system in accordance with the present invention.

FIG. 1 is a block diagram showing a schematic structure of the printing device 2 in accordance with each embodiment of the present invention. The host device 1 may also be realized as a printer server utilizing a network, other than by the system structure as described in FIG. 2, and the printing device 2 may be a composite copier (copier or printer capable of facsimile transmission), other than a simple copier or printer.

The following describes the printing device 2 in more detail referring to FIG. 1. The printing device 2 includes: a data input/output I/F 5; a memory device 6 (memory means); a print data output section 7; and a control section 8. Note that, the control section 8 constitutes transmission requesting means, re-transmission requesting means, and first through fourth combining means.

The data input/output I/F 5 is a data interface which transmits and receives print data to and from the control section 8 controlling the host device 1 and the printing device 2, and which transmits and receives commands to and from various devices. The memory means 6 is realized, for example, by a RAM (Random Access Memory) or hard disk, for saving print data and process data from the control section 8 in accordance with the control of the control section 8. The print data output section 7 outputs (prints out) print data from the control section 8. The control section 8 is realized by various programs written on a CPU (Central Processing Unit), RAM, and ROM (Read Only Memory), and performs all print related controls in the system.

The control section 8 includes a print data image processing section 9; a buffer memory 10; and a page managing memory 11; and a page combining memory 12.

The print data image processing section 9 performs an image process of print data. The buffer memory 10 is used for reading and processing data. The page managing memory 11 is a memory which manages the page numbers of read out print data, page numbers of overwritten print data (data deleted by overwrite), page numbers currently stored in the memory device 6, and page numbers to be used for combining appropriate pages. The page combining memory 12 is a memory which carries out a page combining process (copy unit printing, brochure printing, N-Up printing, etc.). Note that, N-Up printing refers to a print process in which print data of N pages (where N is an even number) are printed on a single sheet of paper by being compressed.

Note that, the memory device 6, buffer memory 10, page managing memory 11, page combining memory 12 may be provided, partially or entirely, in memory means which is provided as an integral unit.

Also, in the present embodiment, as shown in FIG. 1, descriptions will be given through the case where the page managing memory 11 and page combining memory 12 are installed in the printing device 2, utilizing the memory device 6 provided in the printing device 2. Yet, other than by being installed in the printing device 2, the page managing memory 11 and page combining memory 12 may also be installed, for example, in a printer server (not shown), or, alternatively, on the side of the host device Further, a plurality of printing devices 2 may be shared among a plurality of host devices 1, and by installing the page managing memory 11 and page combining memory 12 in a printer server, etc., in the event where the present invention is applied to the plurality of printing devices 2, other effects can be expected in that the system can be centrally managed, and the cost of each printing device 2 can be reduced.

Figure 3:
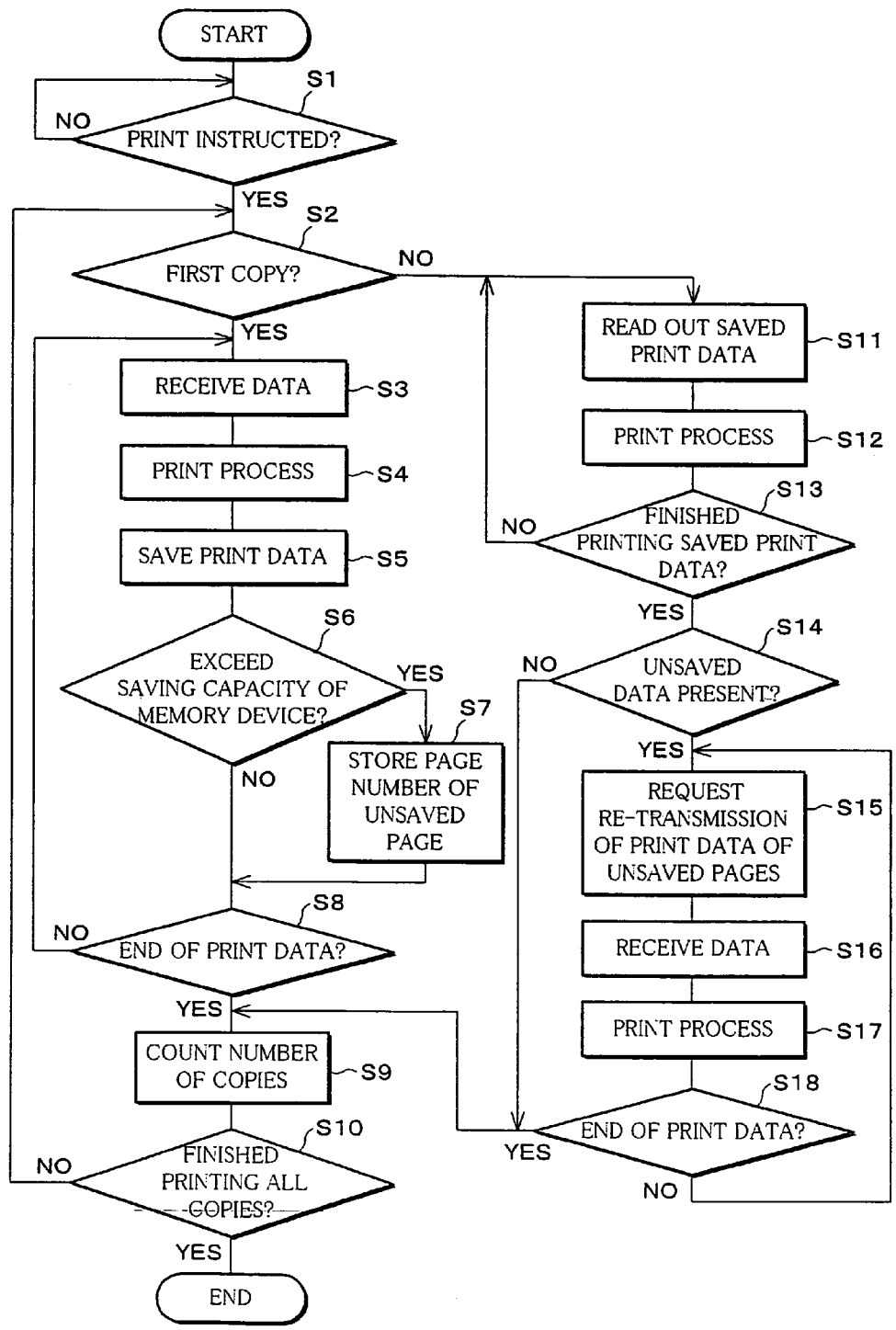
FIG. 3 is a flowchart showing a process in one embodiment of the present invention.

In the present embodiment, in printing of multiple copies, the data of the first copies are printed and they are saved in the memory device 6, and in the second and subsequent copies, printing is carried out by utilizing the saved data and the print data which are in shortage (unsaved print data) and thus re-transmitted from the host device 1 to the printing device 2. FIG. 3 is a flowchart explaining a process of the present embodiment, and the following will describe the process based on FIG. 3.

The process flow starts when the host device 1 and printing device 2 are both in a print ready state, and the printing device 2 waits for a print instruction from the host device 1 (step 1: "S1" hereinafter). When Yes in S1, i.e., when the printing device 2 receives a print instruction signal from the host device 1, the printing device 2 judges as to whether how many copies should be made out of the print data (S2).

When the print data are of the first copy, upon receipt of the print data of the first page from the host device 1 (S3), the printing device 2 carries out a printing process in S4 and saves the print data in the memory device 6 (S5). When the memory device 6 can still save data (S6), the sequence returns to S3, and the receiving process, printing process, and saving process of the print data are carried out for the second and subsequent pages (S8).

In this process, when the memory device 6 cannot save any more of received print data in S6 (when the total volume of print data received so far exceeds the memory capacity of the memory device 6), the memory device 6 stops saving print data, and the page managing memory 11 stores the page numbers of unsaved print data (S7). The process subsequent to S3 is repeated until printing with respect to all the pages of the print data is finished (S8). The page numbers thus stored are to become information which are to be used by the control section 8 to identify print data for which a request of re-transmission will be sent to the host device 1.

When printing of print data with respect to all pages of the first copy is finished, the control section 8 counts the number of copies printed (S9), and when all copies have been printed, the process ends, and if not, the process returns to S2 (S10).

Note that, judgement as to whether print data are to exceed a memory capacity (memory space) of the memory device 6 can be made, for example, by the arrangement in which various information is contained in a header section of communication data and it is transmitted together with the print data when transmitting the print data from the host device 1 to the printing device 2 so as to be checked by the printing device 2, such information including the volume of data to be transmitted, print size, number of pages (total number of pages in a copy), and print mode (draft mode, detail mode, etc.). Alternatively, a step of monitoring the stored memory content may be provided to judge whether the print data are exceeding the capacity of the memory device in accordance with the received print data.

When there are second and subsequent copies (No in S2) the print data saved in the memory device 6 are read out (S11), and the printing process of the print data is carried out in S12, and the processes of S11 and S12 are repeated until printing of the saved print data is finished (S13). This finishes printing of print data for the number of pages stored in the memory device. Then, when the total volume of the print data used in printing of the first copy is not exceeding the memory capacity of the memory device 6 (when there is no print data of unsaved pages), the sequence goes to S9 (S14).

Meanwhile, when there exist unsaved print data of unsaved pages in S14, re-transmission of the print data of the unsaved pages is requested from the printing device 2 to the host device 1 (S15). Note that, the request for re-transmission is made, for example, from the print data which correspond to the youngest page number stored in the page managing memory 11. That is, the control section 8 decides the print data for which re-transmission should be requested to the host device 1 based on the page number.

Upon receipt of the print data of the corresponding unsaved pages (S16), the printing device 2 carries out a printing process of the print data of the unsaved pages (S17). The process subsequent to S15 is repeated until a printing process with respect to all the unsaved pages is finished, and the sequence goes to S9 when the process is finished (S18).

Figure 4:
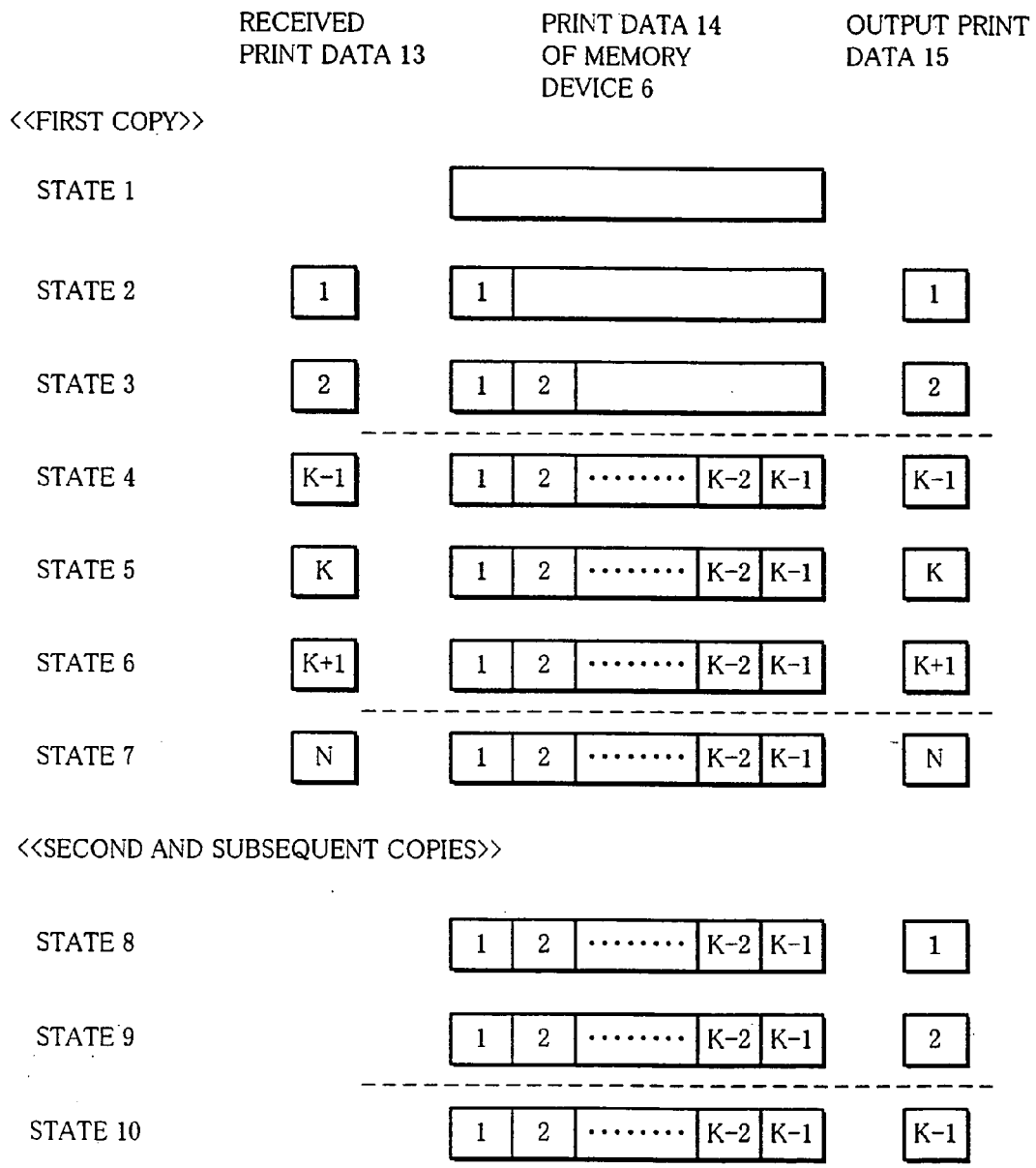
FIG. 4 is an explanatory drawing showing state transition of print data in a memory device in accordance with the embodiment.

FIG. 4 schematically shows state transition of (1) received data 13 from the host device 1, (2) print data 14, and (3) output print data 15 in accordance with the above process flow. The following describes the state transition of each data. Note that, the following description is based on the case where the memory device 6 overflows at page K (memory capacity of the memory device 6 becomes full at page (K−1)) when printing two or more copies of the print data of a total of N pages. Note that, N is a natural number, and K is a natural number which satisfies 1≦K≦N.

First, starting from the print ready state (state 1), the printing device 2 carries out a receiving process, printing process, and saving process of the print data of the first page of the first copy (state 2). Subsequently, the printing device 2 carries out a receiving process, printing process, and saving process of the print data of the second page (state 3). When the memory capacity of the memory device 6 becomes full when the receiving process, printing process, and saving process of the print data of page (K−1) are finished in the described manner (state 4), the print data of the following page K areas directly subjected to printing after received by the printing device 2, and they are not saved in the memory device 6 (state 5).

Then, the receiving process and output process are carried out with respect to page (K+1) to the last page N, in which the received print data 13 are received, and the received print data 13 are directly outputted as output print data 15, and the saving process of the received data on the memory device 6 is not carried out (state 6 and state 7).

In printing of second and subsequent copies, the printing process of the first page to the last page N is carried out using print data 14 saved in the memory device 6 (state 8 to state 10). That is, in the printing process of the first page to page (K−1), the stored data of the memory device 6 is directly subjected to the output process. Meanwhile, in the printing process of page K to page N, as with state 5 to state 7, the host device 1 re-transmits the print data of the page to the printing device 2, and the printing process is carried out as the printing device 2 receives the print data again, and the memory device 6 does not store the received data.

The received print data 13, stored data 14 of the memory device 6, and the print data and page data of the output print data 15 are controlled by the control section 8 of the printing device 2 as shown in FIG. 1 by way of controlling various memory devices (memory device 6, buffer memory 10, page managing memory 11, and page combining memory 12).

As described, in the present embodiment, when printing two or more copies, the print data of the first copy are saved in the memory device 6, and re-transmission of print data is carried out only with respect to the print data which would cause overflow. Thus, the volume of print data transmitted between the host device 1 and printing device 2 can be reduced even in a printing device which is not provided with a large capacity buffer memory, thus realizing efficient printing.

Note that, in the present embodiment, the print data which can be saved are subjected to a saving process after the printing process of the print data is carried out. However, the order of these processes may be reversed.

Also, in the foregoing explanation, for convenience of explanation, the elements storing various types of data are distinguished from one another as the memory device 6, buffer memory 10, page managing memory 11, and page combining memory 12 based on their functions. However, since they are essentially equivalent as a memory device, in the following, the memory device 6, buffer memory 10, page managing memory 11, and page combining memory 12 are referred together simply as a memory device.

Second Embodiment

The following describes another embodiment of the present invention referring to the attached drawings. Note that, the arrangement of the present embodiment is the same as that of the first embodiment except the way print data are saved in the memory device. First, the way the print data are saved in the present embodiment will be described.

In the present embodiment, the print data received are saved in the memory device of the printing device 2 from the leading page as far as the capacity allows so as to carry out a printing process. The received print data which exceed the memory capacity of the memory device are overwritten on the memory device subsequently from the region where the print data of the leading page is saved. Namely, the print data are saved in such a manner that the print data of the pages on the side of the tailing page remain in the memory device at the end of the process, and the unsaved print data are re-transmitted from the host device 1 so as to carry out the printing process.

Figure 5:
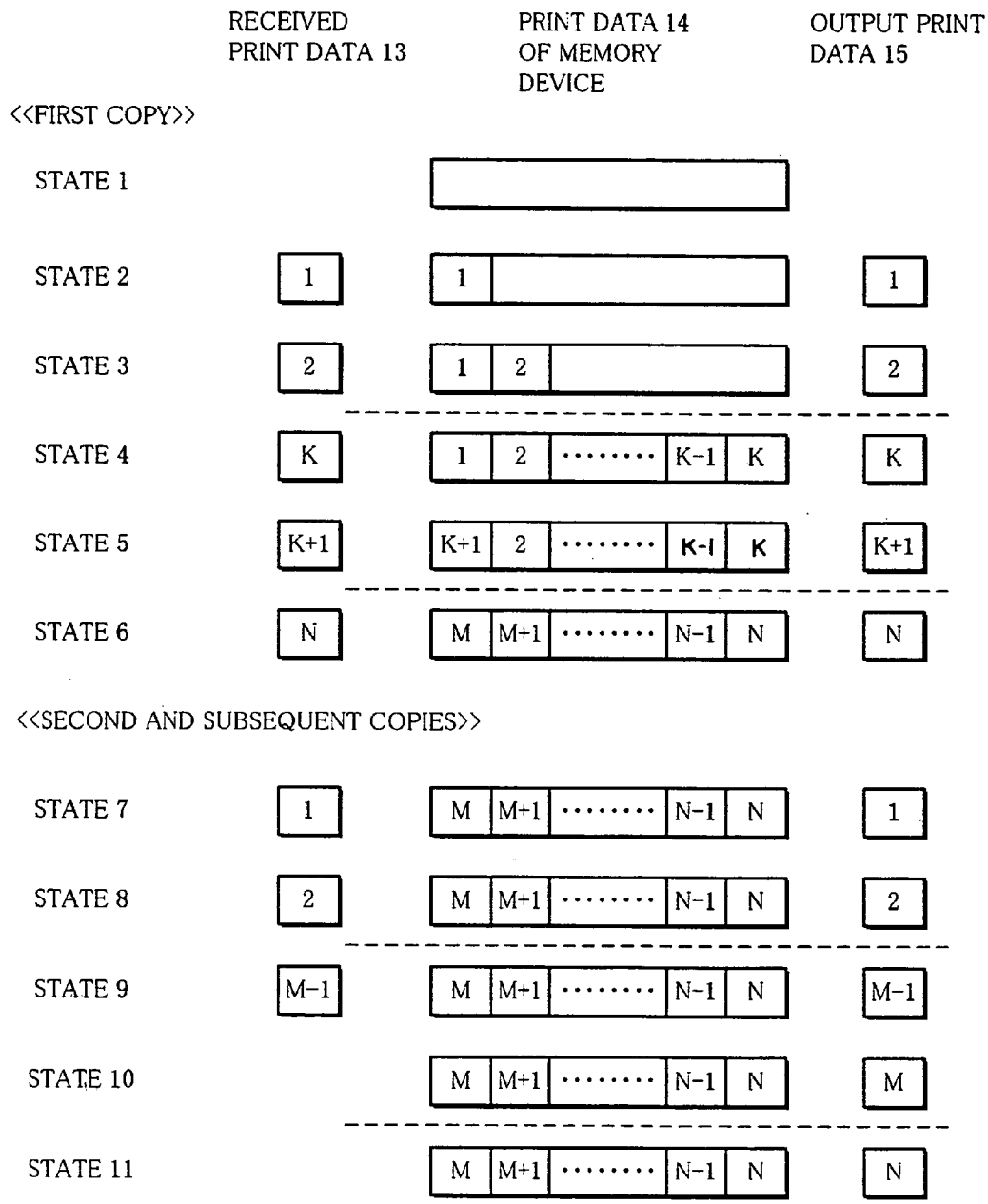
FIG. 5 is an explanatory drawing showing state transition of print data in a memory device in accordance with another embodiment of the present invention.

FIG. 5 schematically shows, as with FIG. 4, state transition of (1) received data 13 from the host device 1, (2) print data 14, and (3) output print data 15. In the following, state transition of each data will be described. Note that, the following description is based on the case where the memory device 6 overflows at page (K+1) (memory capacity of the memory device 6 becomes full at page K).

Starting from a print ready state in state 1, the printing device 2 carries out a receiving process, printing process, and saving process of the print data of the first page of the first copy (state 2). Subsequently, the printing device 2 carries out a receiving process, printing process, and saving process of the print data of the second page of the first copy (state 3). Then, after the repeated process, when no more data can be saved in the memory device by saving the print data of page K (state 4), in the memory device, the print data of the next page (K+1) is overwritten, for example, on the region where the print data of the first page is stored, and a printing process is carried out (state 5). The same process is carried out until the print data of the last page N is saved in the memory device (state 6). Here, the page managing memory 11 stores the page numbers (1, 2, . . . , (M−1)) of the print data which were erased by overwrite. Note that, M is a natural number of not more than N, and it is a page number of the leading page of the print data which are saved in the memory device at the end of the process.

In a printing process of second and subsequent copies, the printing device 2 requests the host device 1 to re-transmit the unsaved print data of the first page to page (M−1), and a printing process of the page 1 to page (M−1) is carried out (state 7 to state 9). After finishing the process, a printing process of the print data of pages M to N, which are saved in the memory device is subsequently carried out (state 10, state 11).

In the present embodiment, since the pages which are not saved in the memory device are on the leading side of all pages, even when the design of the host device 1 is such that it can transmit print data only from the leading page, re-transmission of print data is possible in printing of second and subsequent copies, and thus the present embodiment is more preferable over the first embodiment. Note that, as an example of the system which allows transmission of print data only from the leading page, for example, the non-page independent PDL (Post Script, HP-PCL, LIPS, ESC/Page, PRISCRIBE, etc.) is known.

Note that, in state 6 of the present embodiment, even though the description is based on the case where the print data of the last page N falls on the tail end of the storage area of the memory device, depending on the number of pages, there is a case where the print data ends before it reaches the tail end. In such a case, there remain print data which are not overwritten in the memory device.

However, in the present embodiment, the pages on the tailing side of all pages are saved in the memory device regardless of whether there remain print data which are not overwritten, and thus even when there exist print data which are not overwritten, the effect of the present embodiment can be obtained.

Third Embodiment

The following will describe yet another embodiment of the present embodiment referring to the attached drawings. The present embodiment describes the case where the print data received from the leading page in the manner shown in FIG. 1 are once stored in the memory device 6 so as to carry out brochure printing by combining the saved pages.

In brochure printing, printing is made on a single sheet of paper by combining plural sets of print data, e.g., a combination of the first page and the last page, and for this reason the entire print data need to be stored in the memory device (in the present embodiment, it is assumed that the host device 1 only has the function of transmitting print data subsequently from the leading page).

Figure 6:
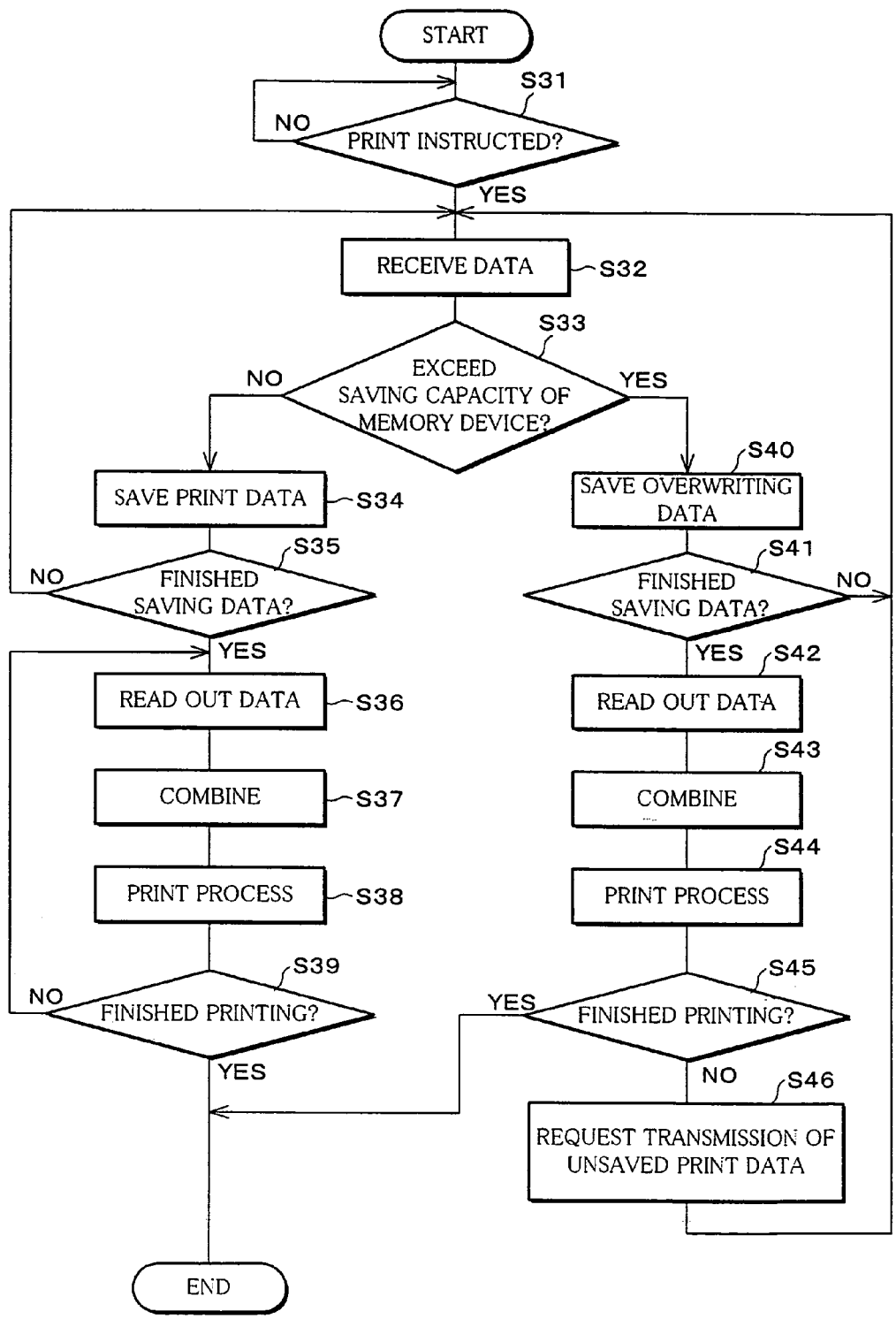
FIG. 6 is a flowchart showing a process in accordance with yet another embodiment of the present invention.

FIG. 6 is a flowchart which describes a process in which, when the volume of print data exceeds the capacity of the memory device while receiving print data from the host device 1 and storing it in the memory device, printing is carried out by combining pages which are stored in the memory device and pages which were re-transmitted from the host device 1.

Firstly, a process flow in which there is no overflow of the memory device will be described. When the printing device 2 in a print ready state recognizes a print instruction from the host device 1 (S31), the printing device 2 receives print data (S32), and upon comparison of the received data with the free memory space of the memory device (S33), the print data are saved in the memory device (S34), and the process is repeated until saving of the print data is finished (S32 to S35).

When saving of the print data is finished, the print data of the pages to be combined are extracted from the memory device by the control section 8 (S36), and a combining process is carried out in S37 for brochure printing, and a printing process is carried out in S38. These processes are repeated until printing of the print data saved in the memory device is finished (S36 to S39), and the process is finished.

The following describes the case where there is overflow of the memory device during reception of the print data. After receiving print data (S32), the printing device 2 compares the volume of received data with the free memory space of the memory device, and when there is shortage of a free memory space (S33), the print data saved in the memory device are divided into front half and latter half in substantially equal volume, and the younger pages of the latter half are erased, overwriting the received data (S40).

Here, page numbers of the unsaved print data are recorded on the memory device (page managing memory 11). This process is repeated until saving of the print data is finished (S32 to S41). Since the leading page and the tailing page are saved at the time when saving of the print data is finished, the control section 8 extracts the pages to be combined from the memory device (S42), and a combining process is carried out in S43 for brochure printing. Thereafter, the printing device carried out a printing process of the combined data (S44).

Here, since there exist pages which were erased by overwrite, printing has not been finished for all pages (S45). The control section 8 requests the host device 1 to re-transmit the print data, and saved pages are not read out (S46). When the printing device 2 receives the print data of unsaved pages (S32), the memory device overwrites the received print data on the pages for which the printing process has been finished (S40). The process is repeated until printing of all print data of the memory device is finished (S32 to S45), and the process is finished.

Note that, in S41, since there are still pages to be printed while an unprinted tailing page is saved in the memory device, the sequence goes to S42. In S40, overwrite is made on printed pages if such pages exist, or on the younger pages of the latter half of the memory device if there are no printed pages. In S46, a request for re-transmission is made and saved pages are not read out, only when overwrite of the latter half has been finished and the sequence has proceeded from S41 to S42, and when otherwise, no process is carried out in S46. Further, when there exists no unsaved page, steps of S32 to S40 are not carried out.

Figure 7:
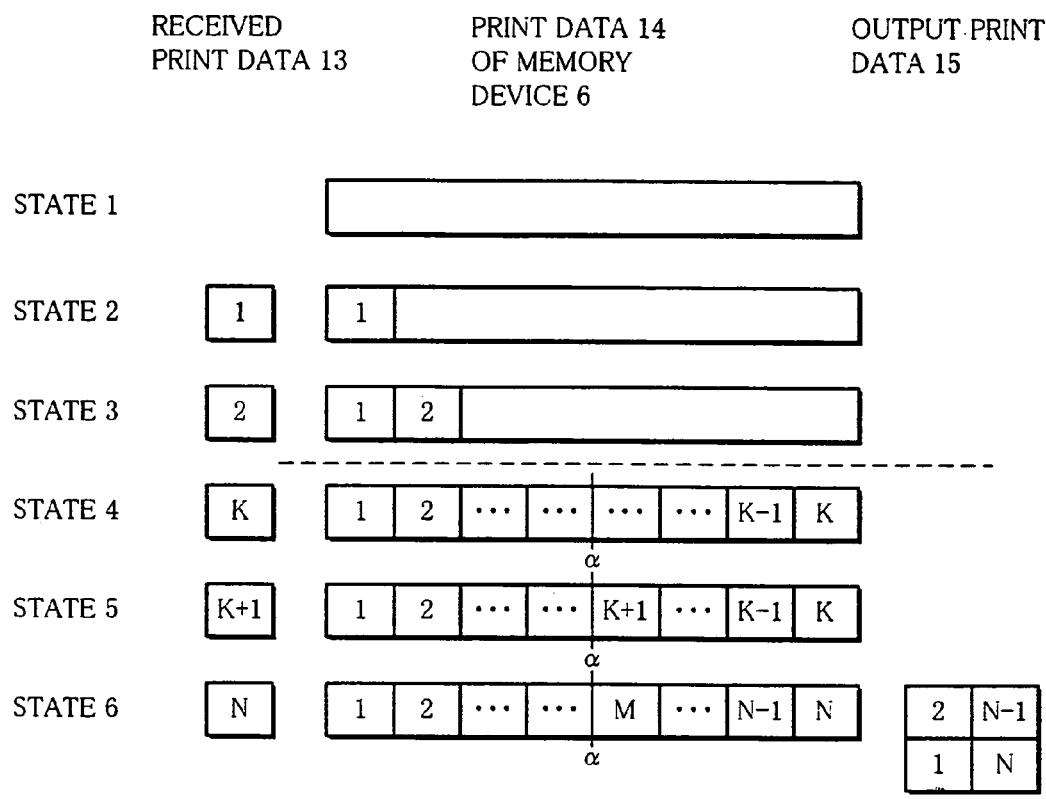
FIG. 7 is an explanatory drawing showing state transition of print data in a memory device in the embodiment.

FIG. 7 shows state transition of print data in the memory device in the process of overflow to overwrite. Note that, in FIG. 7, to clarify the relationship of print data between pages and the front and back of the pages, the output print data 15 are shown in pairs of print data of the right and left side of the pages and the front and back of the pages. The following describes FIG. 7.

First, starting from a print ready state in state 1, the print data of the first page is saved in the memory device of the printing device 2 (state 2). Subsequently, the saving process is repeated until saving of the print data is finished (state 3). When the memory capacity of the memory device becomes full at page K (state 4), saving of the next page (K+1) is started by overwrite from α, which is the boundary dividing the memory capacity of the memory device into the front half and latter half, and the page numbers of overwritten pages (deleted pages) are stored (state 5).

The process is repeated subsequently until the last page N, and after saving the last page (state 6), a combining process and printing process of the saved print data are carried out subsequently. Then, a request for re-transmission of the overwritten data is made to the host device 1, and the data received in response are saved by overwrite on the printed print data, and a combining process and printing process of the received data are carried out until the processes are finished with respect to all the print data.

In the present embodiment, a printing process of brochure printing is possible on the conventionally available memory device without increasing the capacity of the memory device, and since saving is made in order of printing from the leading page and from the tailing page, the saved print data can be utilized efficiently. Note that, as with the second embodiment, taking into consideration the case where re-transmission begins from the leading page, the memory capacity of the latter half of the memory device for saving pages may be increased.

Fourth Embodiment

The following will describe yet another embodiment of the present invention referring to the attached drawings. The present embodiment is a modification example of the saving method of the print data of the third embodiment. In the present embodiment, when the print data exceed the memory capacity of the memory device, instead of dividing the memory device in half by the capacity of the memory device, the memory device is divided in half by the number of pages so that the number of pages becomes equal as close as possible between the front half and the latter half, and saving of data by overwrite is made on the latter half. The memory device may be divided in half by the page number at the time of when first saving data by overwrite in S40 of the flow of FIG. 6, or alternatively, where to divide the memory device may be set everytime the sequence comes to S40.

Figure 8:
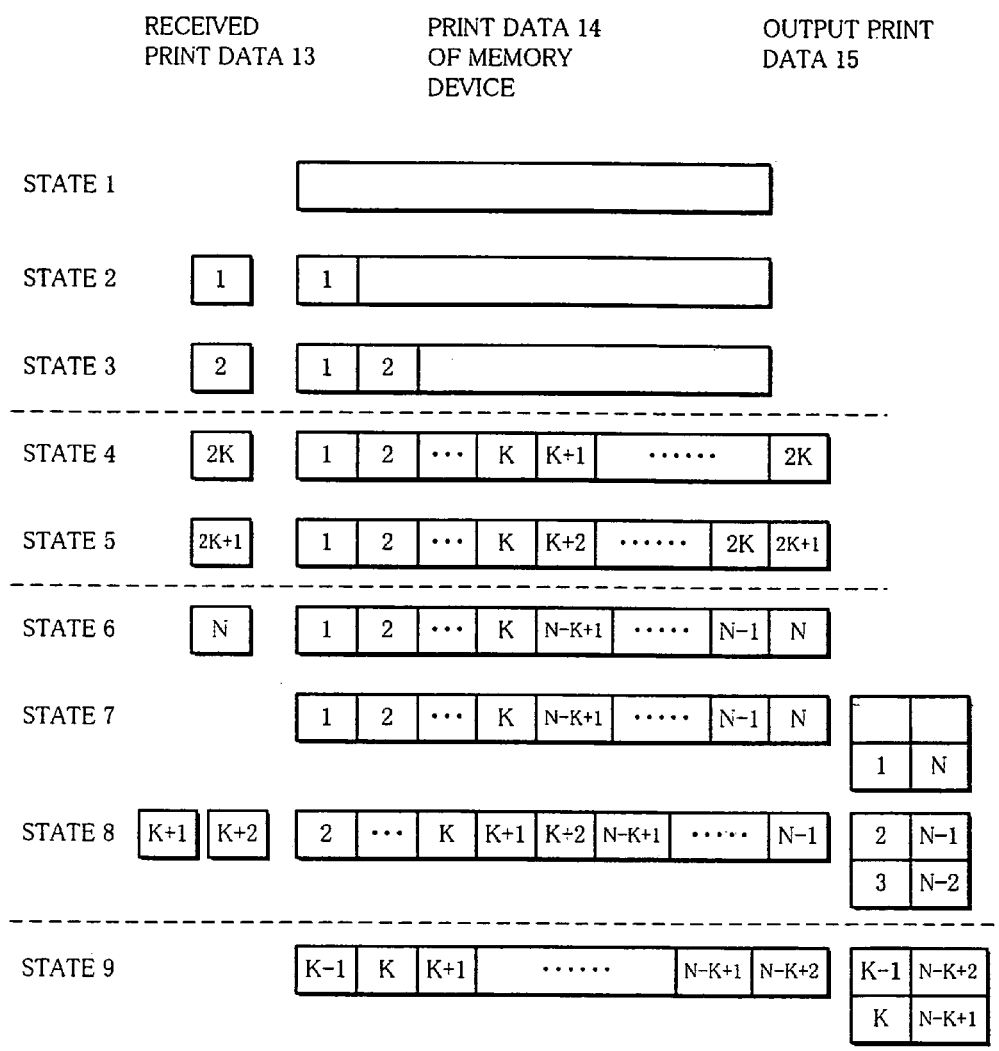
FIG. 8 is an explanatory drawing showing state transition of print data in a memory device in accordance with still another embodiment of the present invention.

The following describes state transition of print data in the memory device referring to FIG. 8. First, starting from a print ready state in state 1, the print data of the first page is saved in the memory device of the printing device 2 (state 2). Subsequently, a saving process is repeated until saving of the print data is finished (S32 to S35 in FIG. 6, state 3).

When the memory capacity of the memory device becomes full at page 2K (state 4), the next page (2K+1) is overwritten on the page succeeding page K, i.e., on page (K+1) (state 5), which at the center of all the saved pages ending at page 2K, and the page number of the overwritten page is stored, and the process is repeated subsequently until the last page N. Note that, in state 5, the saved data are arranged in order of page number. After saving of the print data to the last page is finished, the saved print data are subsequently subjected to a combining process and printing process (state 6, state 7).

Then, the printing device 2 requests the host device 1 to re-transmit the overwritten data, and the data received in response are saved by overwrite on the printed print data, and a combining process and printing process of the received data are carried out until the end of the data (state 8, state 9).

Note that, in state 8, because the print data which have been printed already are overwritten by the print data which were received via re-transmission, the data (page (K+1) and page (K+2)) overwriting the printed data are inevitably stored separately in the front half and latter half of the memory device. However, depending on the data volume, the overwriting data may be stored only either one of the front half and latter half of the memory device. Also, state 9 indicates a state in which all the unsaved data are received from the host device 1.

In transition from state 4 to state 5 in FIG. 8, it appears that the pages are shifted subsequently. However, in actual memory device, page 2K may be overwritten on page (K+1). Note, however, that, the order of successive pages from (K+2), which is to be overwritten next as shown in state 5 in FIG. 8, to page (2K+1) is to be recognized by the control section 8 by the page managing memory 11.

In the present embodiment, a printing process for brochure printing can be made on the conventionally available memory device without increasing the capacity of the memory device. Further, since saving is made in order of printing from the leading page and from the tailing page, the saved print data can be utilized efficiently. Since brochure printing is a printing system which carries out a printing process by combining pages, printing can be carried out more efficiently when the number of pages is equal or close to equal between the front half and the latter half of the memory device.

Further, when the number of pages is large and it requires overwrite of data two or more times, the volume of each page may be stored during the first reception of the data so that, at the time of the second overwrite, the memory device can be divided into front half and latter half in equal or close to equal page number after the process. Alternatively, when it is possible to receive the total number of pages and the volume of each page from the host device 1 in advance to data reception, the memory device may be divided into front half and latter half based on this information.

Figure 9:
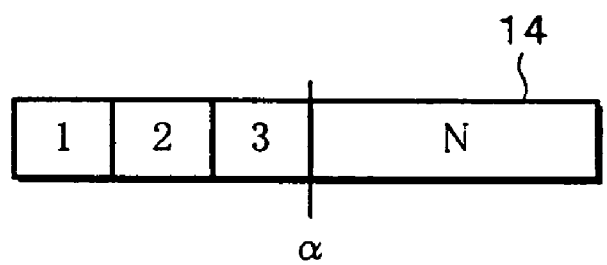
FIG. 9(a) and FIG. 9(b) are drawings explaining advantages of receiving a total number of pages and a volume of each page from a host device in the embodiment.
Figure 9:
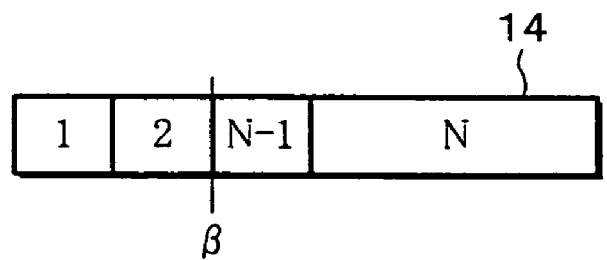

The following describes further advantages of this method referring to FIG. 9(a) and FIG. 9(b).

As shown in FIG. 9(a), when the memory device is divided in half at boundary a based on memory capacity (in this example, the capacity first overflows at page 7), in the event where the volume of the last page N is large, the number of pages in the front half and the latter half becomes different from each other. In such a case, it is required to receive the print data of page (N−1) immediately after the first combining process.

On the other hand, as shown in FIG. 9(b), when the memory device is divided in half at an appropriate position β in advance by the data volume of each page, the print data can be saved in equal page number. In this way, the number of print pages saved in the front half and latter half does not become different from each other, thus smoothly carrying out brochure printing.

Fifth Embodiment

The following will describe still another embodiment of the present invention referring to the attached drawings. The present embodiment describes the case where the host device 1 is capable of transmitting print data successively either from the leading page or the tailing page. Namely, when the memory capacity of the memory device in the printing device 2 becomes full in brochure printing, the printing device 2 (control section 8) requests the host device 1 to transmit the print data of the page to be printed last, and a printing process is carried out by combining the print data received in response and the print data saved in the memory device.

Figure 10:
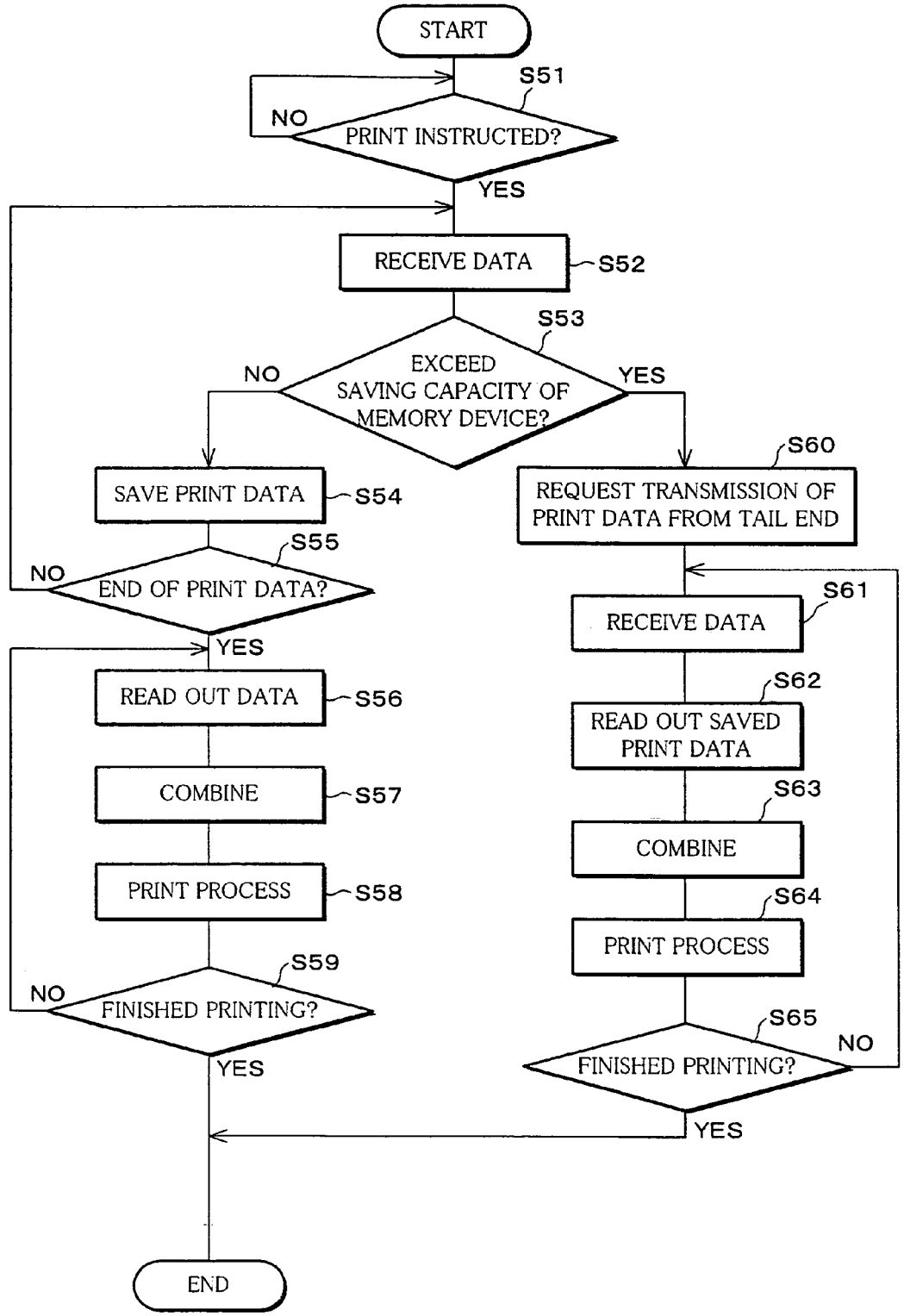
FIG. 10 is a flowchart showing a process in accordance with still another embodiment of the present invention.

FIG. 10 is a flowchart showing a process flow of the present embodiment. The process flow when there is no overflow takes the form of the loop of S52 to S55 and the loop of S56 to S59, as with the third embodiment.

When the memory device overflows during transmission in S53, the printing device 2 finished the receiving process and saving process of the print data from the leading page, and requests the host device 1 to transmit the page data of the tailing page to be printed (S60). After receiving the print data of the page on the tailing side (S61), the print data on the side of the leading page are read out from the saved print data (S62). Thereafter, a combining process of the received print data on the tailing side and the read out print data on the leading side is carried out (S63), and a printing process is carried out (S64). The process is repeated until printing is finished (S61 to S65).

When there exists no more unsaved page, no process is carried out in S61. Considering the case where the saved pages run out before the reception of the unsaved data from the tail end is finished, the process may be re-started from the beginning with regard to the remaining pages.

Figure 11:
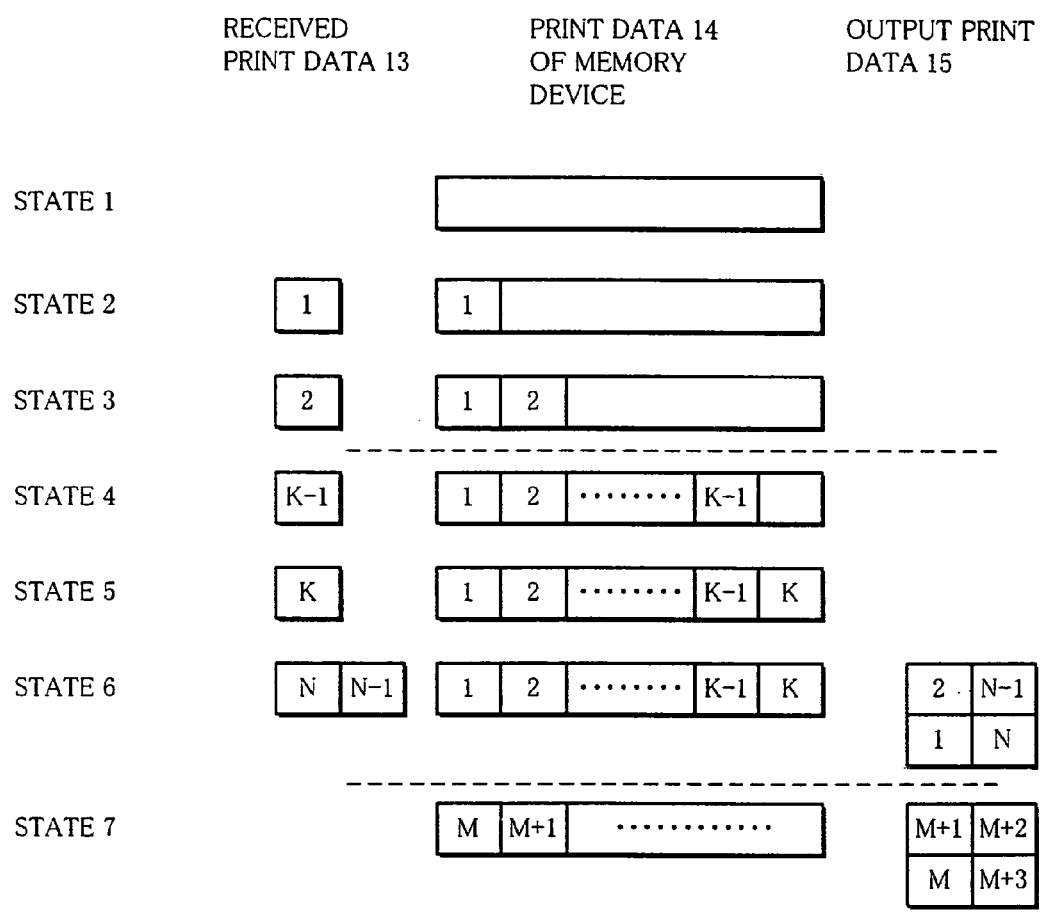
FIG. 11 is an explanatory drawing showing state transition of print data in a memory device in the embodiment.

FIG. 11 shows state transition of print data in the memory device when the memory device overflows and receives print data from the tail end.

First, staring from a print ready state in state 1, the print data of the first page is saved in the memory device of the printing device 2 (state 2). Subsequently, the saving process is repeated until saving of the print data is finished (state 3, state 4). When the memory capacity of the memory device becomes full at page K (state 5), reception and saving of the print data from the leading page are finished.

Then, the printing device 2 requests the host device 1 to transmit print data from the tail end side, and the received print data of page N and page (N−1) and the saved print data of page 1 and page 2 are subjected to a combining process (state 6), and the process is repeated until the end of the print data (state 7).

In the present embodiment, in brochure printing, by receiving unsaved print data from the host device 1 and by using the saved data, the volume of print data transmitted between the host device 1 and the printing device 2 can be reduced even when the print data exceed the memory capacity of the memory device, thus realizing efficient printing.

Sixth Embodiment

The following will describe yet another embodiment of the present invention referring to the attached drawings. In the present embodiment, a combining process and printing process are carried out while the print data to be printed are arranged in order from a leading page and from a tailing page in the memory device as in the third and fourth embodiments, and the print data to be combined and printed next are incorporated into the printing system in advance, and they are saved again in the memory device.

Figure 12:
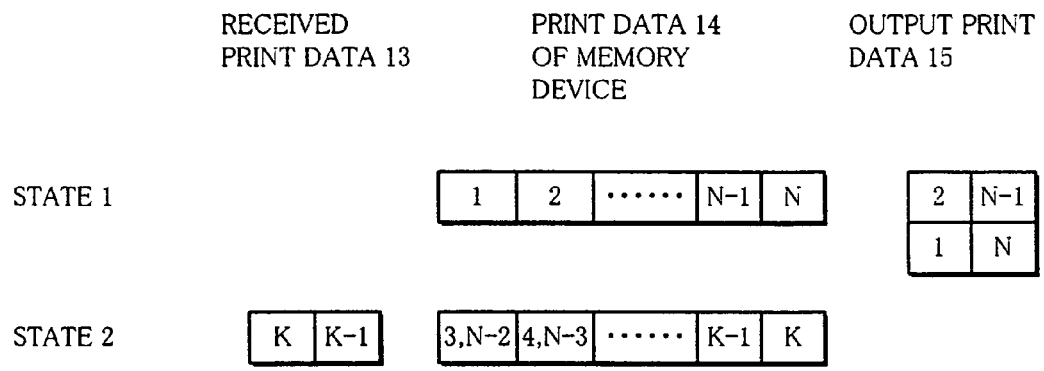
FIG. 12 is an explanatory drawing showing state transition of print data in a memory device in accordance with yet another embodiment of the present invention.

FIG. 12 shows state transition of print data in the memory device. In the state where the print data to be printed are arranged in order from a leading page and from a tailing page in the memory device of the printing device 2 (state 1), printing is carried out by combining the print data of pages 1, 2, . . . , N−1, and N.

Then, from the data of subsequent pages 3, 4, (N−3), and (N−2), the page data of pages 3 and (N−2), and the page data of pages 4 and (N−3) are each combined with each other, and the pairs of data are overwritten on the printed page data of pages 1 and 2, respectively. Further, the newly received page data of pages K and (K−1) are overwritten on the printed page data of pages (N−1) and N, respectively (state 2). The process is repeated until output of the print data is finished.

In brochure printing, in a state where the page data are arranged in order from a leading page and from a tailing page as in the third and fourth embodiments, by saving subsequent pages to be printed in combination in the memory device in advance, the time required for making combinations can be reduced, thus increasing the print speed.

The foregoing described the embodiment of the present invention. When the output of the printing device 2 is to be reversed depending on whether the output is face-up or face-down, rearrangement of data, direction of overwrite, and order of storage are set appropriately in accordance with the utilized mode.

Also, for example, the content as described with reference to the arrangement of the control section 8 of FIG. 1 and with reference to the flowcharts may be partially or entirely realized in the form of separate or integral hardware. Further, these arrangements may be realized partially or entirely in the form of software to be installed as an application program or driver software which operates in the host device 1, or alternatively they may be realized in the form of a control program or the like of the printing device 2. Further, when these arrangements are to be realized in the form of software, such software may be stored in a predetermined recording medium to be executed on the host device 1 and printing device 2.

As described, the printing system in accordance with the present invention may have an arrangement which includes: memory means for storing in a page unit print data transmitted from a host device; output section for printing the print data stored in the memory means; and control means for controlling the memory means and the output section, wherein the control means, upon detecting presence of print data of pages which exceed a memory capacity of the memory means, instructs the memory means to store identification information which is to be used to identify the print data of exceeding pages, and requests, based on the identification information, the host device to transmit the print data of exceeding pages corresponding to the identification information, and the control means combines in a page unit the print data stored in the memory means and the print data of exceeding pages which were re-transmitted from the host device so as to print out the data from the output section.

Thus, even in a printing system which adopts a relatively inexpensive printing device not provided with large capacity memory means (buffer memory, work memory), the volume of data transmitted between the host and the printing device, etc., can be reduced by utilizing the print data saved in the memory device, thus having the effect of reducing the burden put on the host and the printing device, etc.

Further, the printing method in the printing system in accordance with the present invention may include the steps of: (a) storing in a page unit print data transmitted from a host device; (b) detecting presence of print data of pages exceeding a memory capacity of the memory means in the step (a); (c) storing identification information for identifying the print data of exceeding pages; (d) requesting, based on the identification information, the host device to re-transmit the print data of exceeding pages; and (e) printing the print data by combining in a page unit the print data stored in the step (a) and the print data of exceeding pages which were re-transmitted from the host device in accordance with the step (d).

Thus, even in a printing system which adopts a relatively inexpensive printing device not provided with large capacity memory means (buffer memory, work memory) the volume of data transmitted between the host and printing devices, etc., can be reduced by utilizing the print data saved in the memory device, thus having the effect of reducing the burden put on the host and the printing device, etc.

Further, the printing method in the printing system in accordance with the present invention may have an arrangement which includes a first overall printing step and a second overall printing step, the first overall printing step including the steps of: (a) receiving print data from a host device in a page unit; (b) detecting receipt of print data in a page unit which exceed a memory capacity of memory means so as to store page information of the exceeding pages in the memory means; (c) storing the received print data subsequently in the memory means in a page unit, and storing the print data of exceeding pages in the memory means by overwrite in descending order from a site where print data of a tailing page is stored toward a site where print data of a leading page is stored; and (d) printing the print data stored in a page unit, and the second overall printing step including the steps of: (e) requesting, based on the page information of exceeding pages, the host device to re-transmit the print data of pages preceding the exceeding pages, and receiving the print data of the pages preceding the exceeding pages in a page unit; (f) printing the pages preceding the exceeding pages based on the print data which were received in a page unit from the host device in the step (e), and printing the exceeding pages based on the print data which were stored in a page unit in the step (c).

Thus, since the unsaved pages are on the leading side, even when the design of the host is such that it can transmit print data only from the leading page, re-transmission of print data is possible in printing of second and subsequent copies, and thus this method is more suitable than the preceding method. Note that, as an example of the system which allows transmission of print data only from the leading page, for example, the non-page independent PDL.

Further, the printing method in the printing system in accordance with the present invention may include the steps of: (a) storing print data by way of storing print data which were transmitted from a host device in memory means in a page unit, in which when presence of print data of pages which exceed a memory capacity of the memory means is detected, information of the exceeding pages is stored in the memory means, and the print data of pages preceding the exceeding pages are subsequently stored from a leading side in an area of the memory means which makes up half of a storage area of the memory means, and the print data of an area corresponding to the other half of the memory means are overwritten so as to store the transmitted print data from a tailing side in a page unit; (b) combining appropriate pages of the print data information stored in a page unit in the step (a), and, with regard to the exceeding pages which are not stored in the memory means, requesting the host device to re-transmit the print data based on the information of exceeding pages so as to combine appropriate pages after re-transmission of the print data; and (c) printing the combined print data on a single recording medium based on the print data combined in the step (b).

Thus, a printing process of brochure printing is possible on the conventionally available memory device without unnecessarily increasing the capacity of the memory device, and since saving is made in order of printing from the leading page and from the tailing page, the saved print data can be utilized efficiently.

Further, the printing method in the printing system in accordance with the present invention, in addition to the steps of the above method, may further include the step of overwriting the print data of the storage area which have been printed already in the step (c) so as to store the print data re-transmitted from the host device.

Thus, in a state where the page data are arranged in order from a leading page and from a tailing page, by saving subsequent pages to be printed in combination in the memory device in advance, the time required for making combinations can be reduced, thus increasing the print speed.

Further, the printing method in the printing system in accordance with the present invention may have an arrangement in which a boundary of the storage area of the memory means is variable in accordance with information volume of the print data transmitted from the host device.

Thus, a printing process for brochure printing can be made on the conventionally available memory device without increasing the capacity of the memory device. Further, since saving is made in order of printing from the leading page and from the tailing page, the saved print data can be utilized efficiently. Since brochure printing is a printing system which carries out a printing process by combining pages, printing can be carried out more efficiently when the number of pages is equal or close to equal between the front half and the latter half of the memory device.

Further, the printing method in the printing system in accordance with the present invention may include the steps of: (a) storing print data transmitted from the host device in a page unit, the print data being stored subsequently from a leading page until presence of print data of pages exceeding a memory capacity of the memory means is detected; (b) combining multiple sets of appropriate pages of print information which is stored in the memory means in a page unit, and with regard to the exceeding pages which are not stored in the memory means, requesting the host device to re-transmit the print data in descending order subsequently from the print data which corresponds to a tailing page so as to combine appropriate pages after re-transmission of the print data; and (c) printing the combined print data on a single recording medium based on the print data which were combined in the step (b).

Thus, in brochure printing, even when the memory capacity of the memory means is exceeded, only unsaved print data are received from the host device and by utilizing the saved data, the volume of data transmitted between the host device and the printing device can be reduced, thus realizing efficient printing.

Further, a recording medium recording a program for instructing a computer to carry out a printing process in the printing system in accordance with the present invention may include a process for storing pages of the print data at least partially in memory means, and a process of printing the print data, when the print data are to exceed a memory capacity of the memory means, by combining first print data, which correspond to print data within the memory capacity of the memory means, and second print data, which correspond to print data exceeding the memory capacity of the memory means and which are transmitted from the host device.

The invention being thus described, it will be obvious that the same way may be varied in many ways. Such variations are not to be regarded as a departure from the spirit and scope of the invention, and all such modifications as would be obvious to one skilled in the art are intended to be included within the scope of the following claims.

What is claimed is:

1. A printing system including a host device which creates print data in a page unit that comprises a plurality of pages or a single page and a printing device which prints out the print data transmitted from the host device,
    said printing device further including memory means for storing pages of the print data at least partially,
    wherein, when the print data exceed a memory capacity of the memory means, the print data are printed out and comprise first print data, which correspond to print data within the memory capacity of the memory means, and second print data, which correspond to print data exceeding the memory capacity of the memory means and which are transmitted from the host device; and
    re-transmission requesting means which requests the host device to re-transmit the second print data to the printing device when the print data are to be printed out in multiple copies,
    wherein printing of the print data of second and subsequent copies is carried out and comprises the first print data and the second print data, which are re-transmitted from the host device in response to the request of the re-transmission requesting means; and
    wherein the memory means stores a tailing side of the print data as the first print data and stores transmitted data from the host device from a leading side, and when stored data reaches the memory capacity, the memory means overwrites the stored data from the leading side so as to store the transmitted data.

2. The printing system as set forth in claim 1, wherein said memory means stores identification information for identifying the second print data, and
    the re-transmission requesting means decides, based on the identification information, the second print data for which re-transmission should be requested to the host device.

3. The printing system as set forth in claim 1, wherein the memory means stores, as identification information, page numbers of the stored data whose content has been erased by overwrite by the transmitted data, and
    the re-transmission requesting means decides, based on the identification information, the second print data for which re-transmission should be requested to the host device.

4. The printing system as set forth in claim 1, wherein, when the print data exceed the memory capacity of the memory means, the memory means provides two storage areas based on the memory capacity in the memory means, in which the print data stored in one of the storage areas from a leading side are maintained, and the print data stored in the other storage area are overwritten so as to store the print data from a tailing side, and
    the printing device further includes first combining means for extracting the print data in order of ascending page number from the one of the storage areas and for extracting the print data in order of descending page number from the other storage area, said first combining means combining the extracted print data from the two storage areas with each other, and the printing device printing out the print data which were combined by the first combining means on a single recording medium.

5. The printing system as set forth in claim 4, wherein memory capacities of the two storage areas are substantially equal.

6. The printing system as set forth in claim 4, wherein the printing device further includes the re-transmission requesting means for requesting the host device to re-transmit, as the second print data, the print data of pages which were erased by overwrite in the other storage area, and
    the memory means stores the re-transmitted print data by overwrite on a storage area of the print data which have been printed already.

7. The printing system as set forth in claim 1, wherein, when the print data exceed the memory capacity of the memory means, the memory means provides two storage areas based on number of pages of the print data in the memory means, in which the print data stored in one of the storage areas from a leading side are maintained, and the print data stored in the other storage area are overwritten by the print data from a tailing side, and
    the printing device further includes second combining means for extracting the print data in order of ascending page number from the one of the storage areas and for extracting the print data in order of descending page number from the other storage area, said second combining means combining the extracted print data from the two storage areas with each other, and the printing device printing out the print data which were combined by the second combining means on a single recording medium.

8. The printing system as set forth in claim 7, wherein the print data respectively stored in the two storage areas have substantially equal page numbers.

9. The printing system as set forth in claim 7, wherein the printing device further includes the re-transmission requesting means for requesting the host device to re-transmit, as the second print data, the print data of pages which were erased by overwrite in the other storage area, and
    the memory means stores the re-transmitted print data by overwrite on a storage area of the print data which have been printed already.

10. The printing system as set forth in claim 1, wherein the memory means stores the first print data both in order of ascending page number from a leading side and in order of descending page number from a tailing side, and
    the printing device further includes fourth combining means for extracting the first print data from the memory means in order of ascending page number and for extracting the first print data in order of descending page number, said fourth combining means combining the extracted first print data with each other, and the printing device printing out the print data which were combined by the fourth combining means on a single recording medium.

11. The printing system as set forth in claim 10, wherein, after printing the print data, the fourth combining means extracts from the memory means the first print data which should be printed next, and combines with each other the first print data extracted, and the memory means stores by overwrite the data combined by the fourth combining means on a storage area storing the data which have been printed already, and the printing device prints out the data stored by overwrite on the memory means on the recording medium.

12. A printing system including a host device which creates print data in a page unit that comprises a plurality of pages or a single page and a printing device which prints out the print data transmitted from the host device, said printing device further including memory means for storing pages of the print data at least partially;

transmission requesting means for requesting the host device to transmit second print data in order of descending page number from a tailing side; and third combining means for extracting first print data from the memory means in order of ascending page number and for combining the extracted first print data with the second print data which were transmitted from the host device in response to the request of the transmission requesting means, and the printing device prints out print data which were combined by the third combining means on a single recording medium, wherein, when the print data exceed a memory capacity of the memory means, the print data are printed out and comprise the first print data, which correspond to print data within the memory capacity of the memory means, and the second print data, which correspond to print data exceeding the memory capacity of the memory means and which are transmitted from the host device.

13. The printing system as set forth in claim 12, wherein the printing device further includes re-transmission requesting means for requesting the host device to re-transmit the second print data when the print data are to be printed out in multiple copies, and the third combining means extracts the first print data in order of ascending page number from the memory means, and combines the extracted first print data with the second print data which were re-transmitted from a tailing side in response to the request of the re-transmission requesting means.

14. A printing system including:

memory means for storing in a page unit that comprises a plurality of pages or a single page of print data transmitted from a host device;

output section for printing the print data stored in the memory means; and control means for controlling the memory means and the output section, wherein the control means, upon detecting presence of print data of pages which exceed a memory capacity of the memory means, instructs the memory means to store identification information which is to be used to identify the print data of exceeding pages, and requests, based on the identification information, the host device to re-transmit the print data of exceeding pages corresponding to the identification information, and the control means combines in a page unit that comprises a plurality of pages or a single page the print data stored in the memory means and the print data of exceeding pages which were re-transmitted from the host device so as to print out the data from the output section; and wherein the memory means stores a tailing side of the print data as the first print data and stores transmitted data from the host device from a leading side, and when stored data reaches the memory capacity, the memory means overwrites the stored data from the leading side so as to store the transmitted data.

15. A printing method in a printing system, comprising the steps of:

(1) storing pages of print data at least partially on memory means, which print data having been transmitted in a page unit that comprises a plurality of pages or a single page from a host device; wherein said step (1) includes the sub-steps of:

storing a tailing side of the print data as the first print data in the memory means and printing method in a printing system and storing the transmitted data from the host device from a leading side, and, when the stored data reach the memory capacity, overwriting the stored data from a leading side so as to store the transmitted data; and (2) printing the print data, when the print data exceed a memory capacity of the memory means, that comprise first print data, which correspond to print data within the a memory capacity of the memory means, and second print data, which are transmitted from the host device and which correspond to print data exceeding the memory capacity of the memory means, wherein said step (2) further includes the sub-steps of:

2(a) requesting the host device to re-transmit the second print data when the print data are to be printed out in multiple copies; and 2(b) printing the print data of second and subsequent copies, which data comprise the first print data and the second print data which are re-transmitted from the host device.

16. The printing method in a printing system as set forth in claim 15, wherein said step 2(a) further includes the steps of:

storing identification information for identifying the second print data in the memory means; and deciding, based on the identification information, the second print data for which re-transmission should be requested to the host device.

17. The printing method in a printing system as set forth in claim 15, wherein said step (1) includes the step of storing, as identification information, page numbers of the stored data whose content has been erased by overwrite by the transmitted data, and said step (2) includes the step of deciding, based on the identification information, the second print data for which re-transmission should be requested to the host device.

18. The printing method in a printing system as set forth in claim 15, wherein said step (1) includes the step of dividing, when the print data are to exceed the memory capacity of the memory means, a storage area of the memory means into two storage areas based on the memory capacity, in which the print data stored in one of the storage areas from the leading side are maintained, and the print data stored in the other storage area are overwritten so as to store the print data from the tailing side, and said step (2) includes the steps of:

extracting the print data in order of ascending page number from the one of the storage areas and extracting the print data in order of descending page number from the other storage area, and printing out the extracted print data from the two storage areas on a single recording medium.

19. The printing method in a printing system as set forth in claim 18, wherein said step (2) further includes the steps of:
  requesting the host device to re-transmit, as the second print data, the print data of pages which were erased by overwrite in the other storage area, and
  storing the re-transmitted print data by overwrite on a storage area of the print data which have been printed already.

20. The printing method in a printing system as set forth in claim 15, wherein said step (1) includes the step of dividing, when the print data are to exceed the memory capacity of the memory means, a storage area of the memory means into two storage areas, in which the print data stored in one of the storage areas from a leading page are maintained, and the print data stored in the other storage area are overwritten by the print data from a tailing page, and said step (2) further includes the steps of:
  extracting the print data in order of ascending page number from the one of the storage areas and for extracting the print data in order of descending page number from the other storage area, and
  printing out the extracted print data from the two storage areas on a single recording medium.

21. The printing method in a printing system as set forth in claim 20, wherein said step (2) further includes the steps of:
  requesting the host device to re-transmit, as the second print data, the print data of pages which were erased by overwrite in the other storage area, and
  storing the re-transmitted print data by overwrite on a storage area storing the print data which have been printed already.

22. The printing method in a printing system as set forth in claim 15, wherein said step (2) further includes the steps of:
  requesting the host device to transmit the second print data in order of descending page number from a tailing side;
  extracting the first print data from the memory means in order of ascending page number, and
  printing out the extracted first print data and the second print data that were transmitted from the host device in response to the request of the transmission requesting means on a single recording medium.

23. The printing method in a printing system as set forth in claim 22, wherein said step (2) further includes the steps of:
  requesting the host device to re-transmit the second print data when the print data are to be printed out in multiple copies; and
  extracting the first print data in order of ascending page number from the memory means; and
  printing out the extracted first print data and the second print data which were re-transmitted from the tailing side in response to the request of the re-transmission requesting means in multiple copies.

24. The printing method in a printing system as set forth in claim 15, wherein said step (1) includes the step of storing the first print data both in order of ascending page number from the leading side and in order of descending page number from the tailing side, and said step (2) further includes the steps of:
  extracting the first print data from the memory means in order of ascending page number and extracting the first print data in order of descending page number; and
  printing out the extracted first print data on a single recording medium.

25. The printing method in a printing system as set forth in claim 24, wherein said step (2) further includes the steps of:
  extracting, after printing the print data, the first print data which should be printed next from the memory means; and
  storing by overwrite the extracted data on a storage area storing the data which have been printed already; and
  printing out the data which were stored by overwrite in the memory means on the recording medium.

26. A printing method in a printing system, comprising the steps of:
  (a) storing in a page unit that comprises a plurality of pages or a single page of print data transmitted from a host device wherein said step (a) includes the sub-steps of:
    storing a tailing side of the print data as the first print data in the memory means and printing method in a printing system and
    storing the transmitted data from the host device from a leading side, and,
  when the stored data reach the memory capacity, overwriting the stored data from the leading side so as to store the transmitted data;
  (b) detecting presence of print data of pages exceeding a memory capacity of the memory means in said step (a);
  (c) storing identification information for identifying the print data of exceeding pages;
  (d) requesting, based on the identification information, the host device to re-transmit the print data of exceeding pages; and
  (e) printing the print data in a page unit that includes the print data stored in said step (a) and the print data of exceeding pages which were re-transmitted from the host device in accordance with said step (d).

27. A printing method in a printing system, comprising a first overall printing step and a second overall printing step, said first overall printing step including the steps of:
  (a) receiving print data from a host device in a page unit that comprises a plurality of pages or a single page;
  (b) detecting receipt of print data in a page unit that comprises a plurality of pages or a single page which exceed a memory capacity of memory means so as to store page information of the exceeding pages in the memory means;
  (c) storing the received print data subsequently in the memory means in a page unit that comprises a plurality of pages or a single page, and storing the print data of exceeding pages in the memory means by overwriting in descending order from a site where print data of a tailing page is stored toward a site where print data of a leading page is stored; and
  (d) printing the print data stored in a page unit that comprises a plurality of pages or a single page, and said second overall printing step including the steps of:
  (e) requesting, based on the page information of exceeding pages, the host device to re-transmit the print data of overwritten pages preceding the exceeding pages, and receiving the print data of the overwritten pages preceding the exceeding pages in a page unit that comprises a plurality of pages or a single page;

(f) printing the overwritten pages preceding the exceeding pages based on the print data which were received in a page unit that comprises a plurality of pages or a single page from the host device in said step (e), and printing the exceeding pages based on the print data which were stored in a page unit that comprises a plurality of pages or a single page in said step (c).

28. A printing method in a printing system, comprising the steps of:
(a) storing print data, which were transmitted from a host device from a leading side of the print data to a tailing side of the print data, in memory means in a page unit that comprises a plurality of pages or a single page, in which when presence of print data of pages which exceed a memory capacity of the memory means is detected, information of the exceeding pages is stored in the memory means, and the print data of pages preceding the exceeding pages are subsequently stored from the leading side in an area of the memory means which makes up half of a storage area of the memory means, and the print data of an area corresponding to the other half of the memory means are overwritten so as to store the transmitted print data from the tailing side in a page unit that comprises a plurality of pages or a single page;
(b) extracting appropriate pages of the print data information stored in a page unit that comprises a plurality of pages or a single page in said step (a),
(c) with regard to the exceeding pages which are not stored in the memory means, requesting the host device to re-transmit the print data based on the information of exceeding pages; and
(d) printing the extracted print data and the print data based on the information of exceeding pages on a single recording medium.

29. The printing method in a printing system as set forth in claim 28, further comprising the step of overwriting the print data of the storage area which have been printed already in said step (c) so as to store the print data re-transmitted from the host device.

30. The printing method in a printing system as set forth in claim 28, wherein a boundary of the storage area of the memory means is variable in accordance with information volume of the print data transmitted from the host device.

31. A printing method in a printing system, comprising the steps of:
(a) storing print data transmitted from the host device in a page unit that comprises a plurality of pages or a single page, the print data being stored subsequently from a leading page until presence of print data of pages exceeding a memory capacity of the memory means is detected;
(b) extracting multiple sets of appropriate pages of print information which is stored in the memory means in a page unit that comprises a plurality of pages or a single page,
(c) with regard to the exceeding pages which are not stored in the memory means, requesting the host device to re-transmit the print data in descending order subsequently from the print data which correspond to a tailing page; and
(d) printing the extracted multiple sets of print data and the print data in descending order subsequently from the print data which correspond to the tailing page on a single recording medium.

32. A printing system including a host device which creates print data in a page unit that comprises a plurality of pages or a single page and a printing device which prints out the print data transmitted from the host device,
said printing device further including memory means for storing pages of the print data at least partially,
wherein, when the print data exceed a memory capacity of the memory means, the print data are printed out and comprise first print data, which correspond to print data within the memory capacity of the memory means, and second print data, which correspond to print data exceeding the memory capacity of the memory means and which are transmitted from the host device; and
re-transmission requesting means which requests the host device to re-transmit the second print data to the printing device when the print data are to be printed out in multiple copies,
wherein printing of the print data of second and subsequent copies is carried out and comprises the first print data and the second print data, which are re-transmitted from the host device in response to the request of the re-transmission requesting means; and
wherein, when the print data exceed the memory capacity of the memory means, the memory means provides two storage areas based on the memory capacity in the memory means, in which the print data stored in one of the storage areas from a leading side are maintained, and the print data stored in the other storage area are overwritten so as to store the print data from a tailing side, and
the printing device further includes first combining means for extracting the print data in order of ascending page number from the one of the storage areas and for extracting the print data in order of descending page number from the other storage area, said first combining means combining the extracted print data from the two storage areas with each other, and the printing device printing out the print data which were combined by the first combining means on a single recording medium.

33. A printing system including a host device which creates print data in a page unit that comprises a plurality of pages or a single page and a printing device which prints out the print data transmitted from the host device,
said printing device further including memory means for storing pages of the print data at least partially,
wherein, when the print data exceed a memory capacity of the memory means, the print data are printed out and comprise first print data, which correspond to print data within the memory capacity of the memory means, and second print data, which correspond to print data exceeding the memory capacity of the memory means and which are transmitted from the host device; and
re-transmission requesting means which requests the host device to re-transmit the second print data to the printing device when the print data are to be printed out in multiple copies,
wherein printing of the print data of second and subsequent copies is carried out and comprises the first print data and the second print data, which are re-transmitted from the host device in response to the request of the re-transmission requesting means; and
wherein, when the print data exceed the memory capacity of the memory means, the memory means provides two storage areas based on number of pages of the print data in the memory means, in which the print data stored in one of the storage areas from a leading side are maintained, and the print data stored in the other storage area are overwritten by the print data from a tailing side, and the printing device further includes second combining means for extracting the print data in order of ascending page number from the one of the storage areas and for extracting the print data in order of descending page number from the other storage area, said second combining means combining the extracted print data from the two storage areas with each other, and the printing device printing out the print data which were combined by the second combining means on a single recording medium.

34. A printing system including a host device which creates print data in a page unit that comprises a plurality of pages or a single page and a printing device which prints out the print data transmitted from the host device, said printing device further including memory means for storing pages of the print data at least partially, wherein, when the print data exceed a memory capacity of the memory means, the print data are printed out and comprise first print data, which correspond to print data within the memory capacity of the memory means, and second print data, which correspond to print data exceeding the memory capacity of the memory means and which are transmitted from the host device; and re-transmission requesting means which requests the host device to re-transmit the second print data to the printing device when the print data are to be printed out in multiple copies, wherein printing of the print data of second and subsequent copies is carried out and comprises the first print data and the second print data, which are re-transmitted from the host device in response to the request of the re-transmission requesting means; and wherein the memory means stores the first print data both in order of ascending page number from a leading side and in order of descending page number from a tailing side, and the printing device further includes fourth combining means for extracting the first print data from the memory means in order of ascending page number and for extracting the first print data in order of descending page number, said fourth combining means combining the extracted first print data with each other, and the printing device printing out the print data which were combined by the fourth combining means on a single recording medium.

35. A printing method in a printing system, comprising the steps of:

(1) storing pages of print data at least partially on memory means, which print data having been transmitted in a page unit that comprises a plurality of pages or a single page from a host device, wherein step (1) includes the step of dividing, when the print data are to exceed the memory capacity of the memory means, a storage area of the memory means into two storage areas based on the memory capacity, in which the print data stored in one of the storage areas from a leading side are maintained, and the print data stored in the other storage area are overwritten so as to store the print data from a tailing side; and (2) printing the print data, when the print data exceed a memory capacity of the memory means, that comprise first print data, which correspond to print data within the a memory capacity of the memory means, and second print data, which are transmitted from the host device and which correspond to print data exceeding the memory capacity of the memory means, wherein said step (2) further includes the sub-steps of:

2(a) requesting the host device to re-transmit the second print data when the print data are to be printed out in multiple copies;

2(b) printing the print data of second and subsequent copies, which data comprise the first print data and the second print data which are re-transmitted from the host device;

2(c) extracting the print data in order of ascending page number from the one of the storage areas and extracting the print data in order of descending page number from the other storage area; and 2(d) printing out the extracted print data from the two storage areas on a single recording medium.

36. A printing method in a printing system, comprising the steps of:

(1) storing pages of print data at least partially on memory means, which print data having been transmitted in a page unit that comprises a plurality of pages or a single page from a host device, wherein step (1) includes the step of dividing, when the print data are to exceed the memory capacity of the memory means, a storage area of the memory means into two storage areas, in which the print data stored in one of the storage areas from a leading page are maintained, and the print data stored in the other storage area are overwritten by the print data from a tailing page; and (2) printing the print data, when the print data exceed a memory capacity of the memory means, that comprise first print data, which correspond to print data within the a memory capacity of the memory means, and second print data, which are transmitted from the host device and which correspond to print data exceeding the memory capacity of the memory means, wherein said step (2) further includes the sub-steps of:

2(a) requesting the host device to re-transmit the second print data when the print data are to be printed out in multiple copies;

2(b) printing the print data of second and subsequent copies, which data comprise the first print data and the second print data which are re-transmitted from the host device 2(c) extracting the print data in order of ascending page number from the one of the storage areas and for extracting the print data in order of descending page number from the other storage area, and 2(d) printing out the extracted print data from the two storage areas on a single recording medium.

37. A printing method in a printing system, comprising the steps of:

(1) storing pages of print data at least partially on memory means, which print data having been transmitted in a page unit that comprises a plurality of pages or a single page from a host device; and (2) printing the print data, when the print data exceed a memory capacity of the memory means, that comprise first print data, which correspond to print data within the a memory capacity of the memory means, and second print data, which are transmitted from the host device and which correspond to print data exceeding the memory capacity of the memory means, wherein said step (2) further includes the sub-steps of:

2(a) requesting the host device to re-transmit the second print data when the print data are to be printed out in multiple copies;

2(b) printing the print data of second and subsequent copies, which data comprise the first print data and the second print data which are re-transmitted from the host device, 2(c) requesting the host device to transmit the second print data in order of descending page number from a tailing side;

2(d) extracting the first print data from the memory means in order of ascending page number, and 2(e) printing out the extracted first print data and the second print data that were transmitted from the host device in response to the request of the transmission requesting means on a single recording medium.

38. A printing method in a printing system, comprising the steps of:

(1) storing pages of print data at least partially on memory means, which print data having been transmitted in a page unit that comprises a plurality of pages or a single page from a host device, wherein step (1) includes the step of storing the first print data both in order of ascending page number from a leading side and in order of descending page number from a tailing side; and (2) printing the print data, when the print data exceed a memory capacity of the memory means, that comprise first print data, which correspond to print data within the a memory capacity of the memory means, and second print data, which are transmitted from the host device and which correspond to print data exceeding the memory capacity of the memory means, wherein said step (2) further includes the sub-steps of:

2(a) requesting the host device to re-transmit the second print data when the print data are to be printed out in multiple copies; and 2(b) printing the print data of second and subsequent copies, which data comprise the first print data and the second print data which are re-transmitted from the host device, 2(c) extracting the first print data from the memory means in order of ascending page number and extracting the first print data in order of descending page number; and 2(d) printing out the extracted first print data on a single recording medium.

* * * * *